United States Patent [19]

Dean et al.

[11] Patent Number: 4,682,468
[45] Date of Patent: Jul. 28, 1987

[54] NON-CATALYTIC METHOD FOR REDUCING THE NO EMISSIONS OF GAS TURBINES

[75] Inventors: Anthony M. Dean, Hampton; Anthony J. DeGregoria, Flemington; James E. Hardy, Lebanon; Richard K. Lyon, Pittstown, all of N.J.

[73] Assignee: Exxon Research and Engineering Company, Florham Park, N.J.

[21] Appl. No.: 715,120

[22] Filed: Mar. 22, 1985

Related U.S. Application Data

[63] Continuation-in-part of Ser. No. 550,398, Nov. 10, 1983, Pat. No. 4,507,269.

[51] Int. Cl.$^4$ ................................................ F02C 7/00
[52] U.S. Cl. .................................. 60/39.02; 60/39.5; 423/235
[58] Field of Search ........................ 60/39.02, 39.5; 423/212, 235, 237

[56] References Cited

U.S. PATENT DOCUMENTS

| | | | |
|---|---|---|---|
| 3,900,554 | 8/1975 | Lyon | 423/212 |
| 4,129,651 | 12/1978 | Koike et al. | 423/235 |
| 4,335,084 | 6/1982 | Brogan | 423/235 |
| 4,372,770 | 2/1983 | Krumwiede | 423/235 |
| 4,473,536 | 9/1984 | Carberg et al. | 423/235 |

FOREIGN PATENT DOCUMENTS 9911  1/1978  Japan .................................... 60/39.5

Primary Examiner—Louis J. Casaregola
Attorney, Agent, or Firm—Henry E. Naylor

[57] ABSTRACT

Disclosed is a method for non-catalytically reducing the amount of NO emitted from gas turbines. The method involves contacting condition effluents of the gas turbine with ammonia, replacing at least a portion of the secondary air used to dilute and cool the combustion effluents with an inert gas, such as exhaust gas from the gas turine. The temperature of the combustion effluents, the time between contacting the combustion effluents with ammonia and passage through the turbine blades, and the amount of ammonia employed is determined by the solution of the set of simultaneous equations derived from the kinetic model disclosed herein.

8 Claims, 1 Drawing Figure

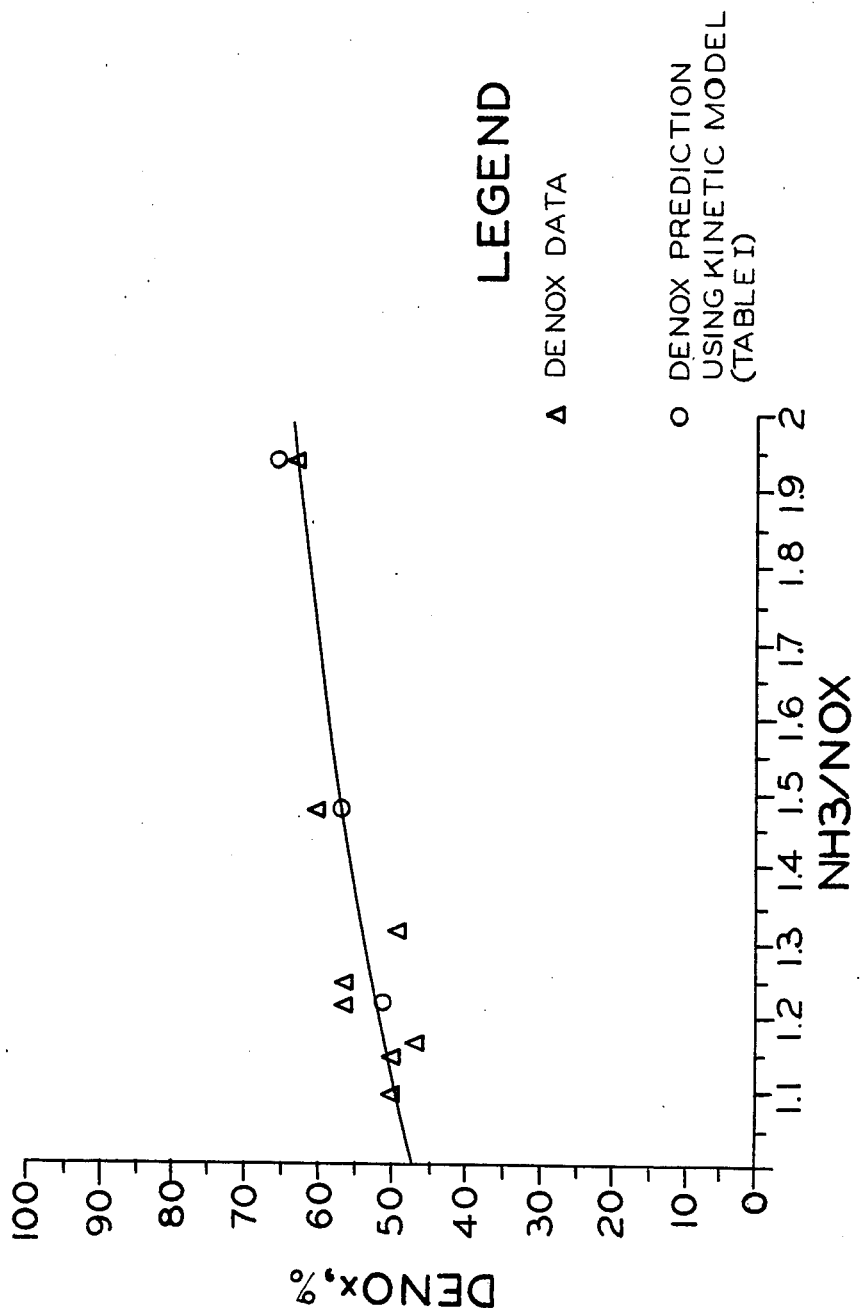

NON-CATALYTIC METHOD FOR REDUCING THE NO EMISSIONS OF GAS TURBINES

CROSS REFERENCE TO RELATED APPLICATIONS

This is a continuation-in-part of U.S. Ser. No. 550,398, filed Nov. 10, 1983, now U.S. Pat. No. 4,507,269.

FIELD OF THE INVENTION

The present invention relates to a non-catalytic method for reducing the amount of NO emitted from gas turbines. The method involves contacting condition effluents of the gas turbine with ammonia, replacing at least a portion of the secondary air used to dilute and cool the combustion effluents with an inert gas, such as exhaust gas from the gas turbine. The temperature of the combustion effluents, the time between contacting the combustion effluents with ammonia and passage through the turbine blades, and the amount of ammonia employed is determined by the solution of the set of simultaneous equations derived from the kinetic model disclosed herein.

BACKGROUND OF THE INVENTION

Combustion effluents and waste products from various installations are a major source of air pollution when discharged into the atmosphere. One particularly troublesome pollutant found in many combustion effluent streams is $NO_2$, a major irritant in smog. Furthermore, it is believed that $NO_2$ undergoes a series of reactions known as photo-chemical smog formation, in the presence of sunlight and hydrocarbons. The major source of $NO_2$ is NO, which to a large degree, is generated at such stationary installations as gas and oil-fired steam boilers for electric power plants, process heaters, incinerators, coal fired utility boilers, glass furnaces, cement kilns, oil field steam generators, and gas turbines.

Various methods have been developed for reducing the concentration of nitrogen oxides in combustion effluents. One such method which was developed is a non-catalytic thermal $deNO_x$ method disclosed in U.S. Pat. No. 3,900,554, to Lyon, which patent is incorporated herein by reference. The process disclosed in that patent teaches the reduction of NO to $N_2$ by injecting ammonia into the combustion effluent stream at a temperature from about 975° K. to about 1375° K. The examples provided in U.S. Pat. No. 3,900,554 show the reduction of NO by $NH_3$ at reaction times in the range of 0.075 to 0.20 sec. and provides no teaching as to how optimum NO reductions may be obtained in situations in which much shorter reaction times are available.

Since the issuance of U.S. Pat. No. 3,900,554, there has been a proliferation of patents and publications relating to the injection of ammonia into combustion effluent streams for reducing the concentration of NO. It is the general consensus of the literature that ammonia injection at temperatures greater than about 1375° K. would result in the generation of NO from ammonia. Consequently, conventional selective noncatalytic $NO_x$ reduction processes are practiced by injecting ammonia at temperatures lower than about 1375° K. Because of this temperature limitation, it is difficult, and sometimes not possible, to apply conventional non-catalytic $NO_x$ reduction processes.

This temperature limitation and the failure of U.S. Pat. No. 3,900,554 to teach how optimum reduction may be obtained are important with respect to gas turbines. In gas turbines, the common practice is to burn the fuel in a combustor with quantities of primary air which are slightly in excess of stoichiometric. This produces combustion effluents whose temperature generally exceeds the maximum temperature the turbine blades can tolerate. Consequently, it is common practice to dilute the primary combustion effluents with secondary air in order to bring their temperature down to the level the blade can tolerate. Since gas turbine efficiencies improve with increasing gas temperatures, there is an economic driving force to increase the temperature of operation. This is offset by the fact that blades capable of tolerating higher temperatures have to be made of exotic expensive materials or conventional blades must be provided with expensive cooling systems. Consequently, turbine designs are usually compromises between these conflicting requirements.

The rate of flow through gas turbines is typically such that the time between mixing primary combustion effluents and the secondary air and the passage of this mixture throught he turbine blades is typically only a few milliseconds, much less than shown in the examples of U.S. Pat. No. 3,900,554.

During their passage through the turbine blades, the combustion effluents are greatly cooled. U.S. Pat. No. 3,900,554 contains the further restriction that the combustion effluents must be at a temperature greater than about 1144° K. when $NH_3$ alone is used, or greater than about 977° K. when $NH_3$ is used in admixture with a second combustible such as hydrogen. Since the combustion effluents are typically well below these temperatures, one cannot apply the process of U.S. Pat. No. 3,900,554 to gas turbine exhaust in most instances.

In an attempt to overcome the limitations of U.S. Pat. No. 3,900,554, Hishinuma, Aimoto, Azuhata, Nakajma, Uchiyama, Oshima, and Kato (ASME publication 79-GT-69) have disclosed a process in which $NH_3$ is used in admixture with $H_2O_2$. This approach, however, has a severe disadvantage due to the high cost of the $H_2O_2$ consumed.

It is also to be noted that the application of U.S. Pat. No. 3,900,554 to gas turbines has been discussed by C. P. Fenimore (Comb. and Flames, 37, 245–250 (1980)). In this article Fenimore explains that when $NH_3$ reacts in the presence of NO and $O_2$, reactions occur whereby $NH_3$ reduces NO to $N_2$ and $H_2O$ and whereby $NH_3$ oxidizes to form NO, the balance between these reactions is dictated by the temperature. While increasing the temperature increases the rate at which $NH_3$ reacts, it also shifts this balance, i.e. shifts the selectivity of the reaction, unfavorably. For reduction of NO within the gas turbine, very rapid reaction is required because of the short time the combustion effluents spend between the combustor and the turbine blades, but favorable selectivity is also required. Fenimore concludes that his work suggests that it might be difficult to meet both requirements simultaneously in gas turbines.

Therefore, there is still a need in the art for methods of practicing non-catalytic $NO_x$ reduction processes which will overcome, or substantially decrease, the limitations of non-catalytic $deNO_x$ with respect to gas turbines.

This need takes several forms. The U.S. Federal Standard for gas turbines is defined in terms of the lb of $NO_x$ emitted per unit of fuel burned and is equivalent to allowing the emission of 75 ppm $NO_x$ in combustion effluents diluted with enough secondary air so that the $O_2$ level is 15%.

While this standard can be met by careful design and operation of the gas turbine and by burning only clean fuels, i.e. fuels with little or no chemically bound nitrogen, situations may occur in which gas turbine operators find themselves about 75 ppm $NO_x$ and need a means of trimming their $NO_x$ emissions.

It is also to be noted that the world's supply of clean fuels, such as natural gas, is finite and as this supply dwindles there is a need to utilize available fuels such as liquids which may be derived from coal and oil shale. Such liquids are high in chemically bound nitrogen and consequently form relatively large amounts of NO when they are burned. A supplier of new gas turbines may wish to modify the design of his turbines to allow them to meet $NO_x$ emission standards while burning fuels of significant nitrogen content, even though such modification may be expensive.

It is also to be noted that under the so-called "bubble" concept, the operator of a number of combustion devices may have the option of controlling the emissions of one or more units to levels well below the levels permitted by the regulations. This would permit him to operator other units at levels above regulation provided the total emissions for all units remains below regulation. Thus, the operator of a gas turbines may have the option of increasing the $No_x$ emissions of some turbines by switching to a nitrogen containing fuel provided he has other units whose emissions can be decreased. Naturally, in such a situation, there is a need to minimize the increase in $NO_x$ emissions the gas turbines using the nitrogen containing fuel.

SUMMARY OF THE INVENTION

In accordance with the present invention there is provided a process for noncatalytically reducing total NO emissions from gas turbines. The process comprises contacting, with ammonia, combustion effluents of the gas turbine, which effluents contain NO and at least 0.1 volume percent oxygen and are at a temperature in the range of about 975° K. to about 1600° K.; wherein (a) the ammonia contacts the combustion effluents prior to their passage through the turbine blades, (b) at least a portion of the secondary air used to dilute the combustion effluents exiting the combustion section of the gas turbine is replaced with an inert gas, and (c) the temperature of the combustion effluents, the time between contacting the combustion effluents with ammonia and their passage through the turbine blades, are based on the solution of the set of simultaneous equations derived from the kinetic model of Table I hereof.

In preferred embodiments of the present invention the inert gas is exhaust gas from the gas turbine itself or any other suitable combustion device.

In other preferred embodiments of the present invention the combustion effluents are at a pressure from about 3 to about 15 atmospheres, and a temperature from about 1300° K. to 1500° K.

BRIEF DESCRIPTION OF THE FIGURES

The sole FIGURE hereof shows actual performance data versus predicted performance data generated by use of the kinetic model disclosed herein, for a 235 megawatt utility boiler.

DETAILED DESCRIPTION OF THE INVENTION

As is well-known, combustion is effected in gas turbines by burning a suitable fuel in air at elevated pressures inside a section of the equipment generally known as the combustor. The principal combustion products are carbon dioxide and steam and those products, along with the other combustion products, such as carbon monoxide and the various oxides of nitrogen and sulfur, combined with any excess oxygen and unconverted nitrogen to form what is referred to herein as the primary combustion effluents. There primary combustion effluents are generally at a temperature greater than the turbine blades can withstand and thus, are cooled by any suitable means. The cooling means commonly used include mixing the primary combustion effluents with air or steam at elevated pressures and injecting liquid water. The case in which the fuel being burned is a low BTU gas may be an exception to the above since its heat of combustion may be low enough to produce a primary combustion effluent whose temperature is low enough for the turbine blades to withstand.

In all cases, however, the combustion effluents are expanded and cooled by passage through the turbine blades. The residence time of the combustion effluents within the gas turbine prior to expansion varies with turbine design but is frequently only a few milliseconds. Such resident times will generally vary from about 0.001 to 0.05, longer residence are preferred for the purpose of the present invention.

The primary combustion effluents will usually contain about 0.1 to 5% $O_2$, and typically between 1 and 3% $O_2$. The oxygen content of the combustion effluents after dilution with secondary coolant will vary with the nature of the coolant. The mode of operation which is currently most common is dilution with secondary air which produces a mixture typically containing roughly 15% $O_2$. If recycled exhaust gas is used, the oxygen content would be the same as the primary combustion effluent, usually about 0.1 to 5% $O_2$ and typically between 1 and 3% $O_2$. If exhaust gas from some other unit is used the oxygen content will not necessarily be the same as in the primary combustion effluents but it will be in the same range. If steam is used the range for the oxygen content will be decreased by the dilution factor which is typically around 2 or 3.

The amount of ammonia used herein ranges from about 0.4 to 10 moles, preferably 1 to 3 moles of ammonia per mole of NO.

The instant process is carried out at the pressure of gas turbine operation. Such pressures are generally in the range of about 3 to 15 atmospheres and more usually in the range of 6 to 10 atmospheres. Temperatures are in the range of about 975° K. to 1600° K., preferably from about 1300° K. to about 1500° K., with the upper portion of this temperature range associated with the use of $NH_3$ alone and the lower portion associated with the use of $NH_3$ in admixture with $H_2$.

The time between contacting the combustion effluents with ammonia and passage through the turbine blades is preferably greater than 0.001 seconds.

Although at temperatures above about 1375° K., conventional non-catalytic $deNO_x$ processes are generally inoperative, the inventors hereof have identified a critical set of conditions whereby $NO_x$ may now be practiced on a wider variety of combustion installations, such as gas turbines, than heretofore thought possible.

Furthermore, practice of the present invention enables a more effective non-catalytic deNO$_x$ operation at temperatures above about 1300° K.

Because it is difficult to accurately simulate, on a laboratory scale, the temperature time history of combustion effluents as they pass through a gas turbine, it is necessary to generate examples by means other than laboratory experiments. Complex chemical reactions occur by a series of elementary reaction steps and if one knows the rate constants for such steps, a theoretical kinetic mechanism can be developed and verified through comparison with experimental data. An extensive block of kinetic data was developed herein by use of apparatus similar to the apparatus taught in U.S. Pat. No. 3,900,554 and used to determine which elementary reactions would likely be of significance during the reduction of NO by NH$_3$. For many of the reactions, the rate constants were wellknown accurately measured constants of nature whereas for the remaining reactions the rate constants were not accurately known and accordingly were taken as adjustable parameters. That is, values for the unknown rate constants were assumed and the reaction kinetics to be expected from these rate constants were calculated and compared with the observed kinetics. Based on this comparison, a new set of rate constants was assumed, etc., until satisfactory agreement between calculation and experimentation were finally obtained. As a result, the kinetic model hereof, and respective rate constants, were developed by the inventors hereof for accurately predicting the conditions for the practice of the present invention.

In the practice of the present invention the effluent stream to be treated is measured to determine the content of NO, O$_2$, and H$_2$O. These initial conditions, and the time/temperature history of the combustion effluents are used in conjunction with the kinetic model hereof with appropriate software to determine the amount of ammonia and an injection point which will give NO reduction. Appropriate software suitable for use herein would be any computer program designed for numerical integration of chemical rate expressions. A non-limiting example of such software is CHEM-KIN; A General-Purpose, Problem-Independent, Transportable, Fortran Chemical Kinetics Code Package; R. J. Kee, J. A. Miller, and T. H. Jefferson, an unlimited released Sandia National Laboratory Report SAND808003 (1980). This report is also available through the National Technical Information Service, U.S. Department of Commerce.

The following example is offered, not as an illustration of the subject invention, but to demonstrate the validity of the kinetic model employed herein. The model was used to calculate the NO reduction to be expected for a 235 megawatt utility boiler of the following characteristics:

Flue Gas Flow Rate 2,000,000 lb/hr at 3-4% O$_2$ dry
Flue Gas Temperature 880°-1040° C.
NO Conc. 190-220 ppm at 3-4% O$_2$ dry The FIGURE (diamonds) contains actual performance data on the above boiler at full load with a best fit curve through the data. The circles in the FIGURE represent paper data generated by use of the kinetic model hereof. The FIGURE illustrates the surprisingly good agreement of model data vs. actual data.

The good agreement between prediced and observed NO reduction illustrates that the kinetic model is reliable for calculating NO reduction.

The advantages of the kinetic computer model hereof are substantial in that it permits one skilled in the art to readily determine, by calculation, the embodiment of the present invention which will yield optimum results for his particular circumstances. In general, however, it may be said that the present invention is an improved method of noncatalytic reduction of NO with NH$_3$, the improvement of the present invention relating to the optimization of the kinetics of the NO reduction reaction in order to obtain a satisfactory reduction of NO within the limited reaction time available in gas turbines. The parameters one skilled in the art may vary to achieve such as an optimum include the amount of NH$_3$ injected, the initial NO level, the manner in which the primary combustion effluents are cooled, and, in the case of new turbines, the reaction time. The temperature may range from 975° K. to 1600° K. at the point at which the NH$_3$ contacts the combustion effluents and volumn ratio of NH$_3$ to NO may vary from 0.4 to 10.

TABLE I

| KINETIC MODEL Rate constant $K = AT^n \exp(-E/(1.98)T)$ | | | |
|---|---|---|---|
| REACTION | A | n | E |
| 1. NH$_3$ + O = NH$_2$ + H$_2$ | .246 E + 14 | 0.0 | 17071. |
| 2. NH$_3$ + O = NH$_2$ + OH | .150 E + 13 | 0.0 | 6040. |
| 3. NH$_3$ + OH = NH$_2$ + H$_2$O | .326 E + 13 | 0.0 | 2120. |
| 4. HNO + M = NO + H + M | .186 E + 17 | 0.0 | 48680. |
| 5. HNO + OH = NO + H$_2$O | .360 E + 14 | 0.0 | 0. |
| 6. NH$_2$ + HNO = NH$_3$ + NO | .175 E + 15 | 0.0 | 1000. |
| 7. NH$_2$ + NO = NNH + OH | .610 E + 20 | −2.46 | 1866. |
| 8. NH$_2$ + O$_2$ = HNO + OH | .510 E + 14 | 0.0 | 30000. |
| 9. NNH + NH$_2$ = N$_2$ + NH$_3$ | .100 E + 14 | 0.0 | 0. |
| 10. NH$_2$ + O = NH + OH | .170 E + 14 | 0.0 | 1000. |
| 11. NH$_2$ + OH = NH + H$_2$O | .549 E + 11 | 0.68 | 1290. |
| 12. NH$_2$ + H = NH + H$_2$ | .500 E + 12 | 0.5 | 2000. |
| 13. NH + O$_2$ = NHO + O | .300 E + 14 | 0.0 | 3400. |
| 14. H$_2$ + OH = H$_2$O + H | .220 E + 14 | 0.0 | 5150. |
| 15. H + O$_2$ = OH + O | .220 E + 15 | 0.0 | 16800. |
| 16. O + H$_2$ = OH + H | .180 E + 11 | 1.0 | 8900. |
| 17. H + HO$_2$ = OH + OH | .250 E + 15 | 0.0 | 1900. |
| 18. O + HO$_2$ = O$_2$ + OH | .480 E + 15 | 0.0 | 1000. |
| 19. OH + HO$_2$ = H$_2$O + O$_2$ | .500 E + 14 | 0.0 | 1000. |
| 20. OH + OH = O + H$_2$O | .630 E + 13 | 0.0 | 1090. |
| 21. HO$_2$ + NO = NO$_2$ + OH | .343 E + 13 | 0.0 | −260. |
| 22. H + NO$_2$ = NO + OH | .350 E + 15 | 0.0 | 1500. |
| 23. O + NO$_2$ = NO + O$_2$ | .100 E + 14 | 0.0 | 600. |
| 24. H + O$_2$ + M = HO$_2$ + M H$_2$O/21** | .150 E + 16 | 0.0 | −995. |
| 25. NNH + M = N$_2$ + H + M | .200 E + 15 | 0.0 | 30000. |
| 26. NO$_2$ + M = NO + O + M | .110 E + 17 | 0.0 | 66000. |
| 27. NH$_3$ + M = NH$_2$ + H + M | .480 E + 17 | 0.0 | 93929. |
| 28. O + O + M = O$_2$ + M | .138 E + 19 | −1.0 | 340. |
| 29. NH$_2$ + NO = N$_2$ + H$_2$O | .910 E + 20 | −2.46 | 1866. |
| 30. NNH + OH = N$_2$ + H$_2$O | .300 E + 14 | 0.0 | 0. |
| 31. NNH + NO = N$_2$ + HNO | .906 E + 12 | 0.0 | 0. |

**i.e. A = 21 × .15 E + 16 for H$_2$O as "third body".

Given this model, one having ordinary skill in the art can identify a corresponding set of simultaneous equations for solution.

EXAMPLE OF USE OF KINETIC MODEL

To illustrate the practice of the present invention and its advantage over the prior art the paper examples below are presented.

For these examples a gas turbine will be assumed which operates at 10 atmospheres while burning a fuel with a H/C ratio of 1.5. The turbine combustor is assumed to operate at an excess air level of 5% and to produce 10$^4$ Nm$^3$/hr of primary combustion effluents having a composition of 1% O$_2$, 9.8% H$_2$O, 13.1% CO$_2$, and 76.0% N$_2$. If secondary air is used to dilute the primary combustion effluents down to a temperature tolerable for the turbine blades, it is assumed that $2.8 \times 10^4$ Nm$^3$/hr of secondary air are used and with the result that the gas emitted to the atmosphere is $3.8 \times 10^4$ Nm$^3$/hr of 15% $O_2$, 2.6% $H_2O$, 3.4% $CO_2$ and 78.9% $N_2$.

The NO level in the emitted gas will depend on both the combustor design and the nitrogen content of the fuel being burned. For purposes of our example, one assumes that a manufacture of gas turbines produces a turbine in which the primary combustion effluents are blended with the secondary air 0.002 seconds prior to passage through the turbine blades and that NO level in the turbine's exhaust gas is 79 ppm, i.e. slightly above regulations. Furthermore, in order to guarantee that the turbine will consistently meet regulations the manufacture must achieve NO levels significantly below regulations.

It would be within the skill of the art to add NH$_3$ to the secondary air in the hope of noncatalytically reducing the NO but the art provides no means of determining how effective said NH$_3$ addition might be, short of very expensive experimentation. Furthermore, it is within the skill of the art to adjust the temperature at which the turbine operates, but other than for expensive experimentation, there is no means of determining what is the optimum temperature. Finally, it would be within the skill of the art to increase the time between mixing of the secondary air with the primary combustion effluents and their passage through the turbine blades, but said increase would involve significant expense and there is no means available in the prior art for determining how much a given increase in reaction time will improve the NO reduction.

Using the kinetic model hereof, however, one can readily calculate the NO reduction to be expected under various circumstances. Table II shows the results of such a calculation, i.e., shows the amount of NO remaining for various temperatures and reaction times for reduction of NO by NH$_3$ at an NH$_3$/NO ratio of 3.8. In this calculation it is assumed that the initial gas mixture contained equilibrium amounts of OH and O.

Given the information in Table II hereof, the turbine manufacture can readily make the appropriate design compromises. If, for example, the manufacture chooses to maintain the 0.002 sec. time between mixing and passage through the turbine blades, a temperature between 1270° K. and 1290° K. will provide the best reduction. If a reduction to 40 ppm is desired, this would require increasing the time to 0.008 seconds and dropping the temperature to 1250° K.

As a further illustration of the present invention, consider the case of a gas turbine manufacture who wished to produce a turbine whose NO emissions are less than regulations when it burns a fuel with high nitrogen content, i.e., a fuel with a severe tendency to form NO. For purposes of illustration we assume that the manufactor's unmodified turbine produces $3.8 \times 10^4$ Nm$^3$/hr of exhaust gas containing 316 ppm NO when burning said fuel, i.e. produces 12.0 Nm$^3$/hr of NO which is 4.2 times as much NO as regulations allow.

Let us further assume that the gas turbine operates with 0.002 sec between mixing and passage of the combustion effluents throught the turbine blades and that it is not desired to increase this time, but that it is feasible to modify the turbine so that the secondary air is replaced with recycled exhaust gas. This decreases the total amount of gas emitted: i.e. of $3.8 \times 10^4$ Nm$^3$/hr of exhaust gas produced $2.8 \times 10^4$ Nm$^3$/hr is recycled and only $1 \times 10^4$ Nm$^3$/hr is emitted. switching from secondary air to recycled exhaust gas does not in itself decrease NO emissions. They remain 12 Nm$^3$/hr but the concentration of NO in the exhaust gas increases to 1200 ppm.

Using the kinetic model hereof and a repetitive but straight forward calculation, it can readily be determined that for this example the optimum temperature is about 1450° K. and that reduction of NO with NH$_3$ at 1450° K. and NH$_3$/NO=3.8 will produce an exhaust gas containing 153 ppm NO, corresponding to an emission of 1.53 Nm$^3$/hr of NO, well below the 2.85 Nm$^3$/hr of NO permitted by the regulations.

In some situations, however, the gas turbine operator may have the option of replacing the secondary air with a gas other than recycled exhaust. For example, gas turbines are commonly used to supply power in oxygen plants. It often happens that because there is little or no market for the large amounts of nitrogen which the oxygen plant coproduces, it is vented. Turbines are also used in natural gas production facilities. Natural gas varies in composition, and in some instances contains large amounts of $CO_2$ which is separated and vented before pipelining the gas. The nitrogen from the oxygen plant, the carbon dioxide from the natural gas, and other inert gases which may be available in special circumstances, may be used to replace secondary air in gas turbines.

If, for example, a turbine operator replaces the secondary air with nitrogen in the example above, the result is a gas having a composition 0.26% $O_2$, 2.6% $H_2O$, 3.4% $CO_2$, equilibrium amounts of O and OH and balance $N_2$.

Table III shows the amounts of NO remaining at various temperatures and reaction times after reduction of an initial 79 ppm NO by NH$_3$ at NH$_3$/NO=3.8.

TABLE II

Reduction of NO in a Gas Turbine:
Optimization of Reaction Time and Temperature
(10 atm, 15% $O_2$, 2.6% $H_2O$, 3.4% $CO_2$, 78.9% $N_2$, NH$_3$/NO = 3.8)

| T, °K. = | 1230 | 1250 | 1270 | 1290 | 1310 |
|---|---|---|---|---|---|
| NO, ppm, initial = | 79 | 79 | 79 | 79 | 79 |
| time, sec | NO, ppm | | | | |
| 0.002 | 65 | 63 | 62 | 62 | 64 |
| 0.004 | 54 | 52 | 51 | 51 | 58 |
| 0.006 | 47 | 45 | 45 | 45 | 56 |
| 0.008 | 41 | 40 | 42 | 42 | 55 |
| 0.010 | 37 | 36 | 39 | 39 | 55 |
| 0.012 | 33 | 34 | 38 | 38 | 55 |
| 0.014 | 31 | 32 | 36 | 36 | 55 |
| 0.016 | 29 | 31 | 36 | 36 | 56 |
| 0.018 | 27 | 30 | 35 | 35 | 56 |
| 0.020 | 26 | 29 | 35 | 35 | 57 |

TABLE III

Reduction of NO in a Gas Turbine in which secondary air has been replaced with $N_2$.
Gas composition before reaction: 0.26% $O_2$, 2.6% $H_2O$, 3.47% $CO_2$, 79 ppm NO, 300 ppm NH$_3$, equilibrium O and OH, balance $N_2$
Pressure = 10 atm.

| T = | 1250° K. | 1300° K. | 1350° K. | 1400° K. | 1450° K. |
|---|---|---|---|---|---|
| Time, sec, | | NO, ppm | | | |
| 0.002 | 72.7 | 67.2 | 60.3 | 52.9 | 49.6 |
| 0.004 | 67.6 | 56.2 | 42.9 | 34.0 | 45.4 |
| 0.006 | 63.2 | 46.4 | 30.1 | 25.9 | 48.9 |
| 0.008 | 59.4 | 37.7 | 21.8 | 23.3 | 50.8 |
| 0.010 | 55.8 | 30.5 | 16.6 | 23.0 | 50.9 |

What is claimed is:

1. In a gas turbine which operates at superatmospheric pressures and which contains: (a) a combustor in which primary air and fuel are introduced, (b) combustion effluents at a temperature from about 975° K. and 1600°K. and containing NO and at least 0.1 volume percent oxygen, (c) a source of secondary air for diluting and cooling the combustion effluents, and (c) turbine blades; the improvement which comprises: (i) reducing the total amount of NO emitted from the gas turbine by contacting the combustion effluents prior to passage through the turbine blades with ammonia; (ii) replacing at least a portion of the secondary air with inert gas; and (iii) determining the temperature of the combustion effluent, the residence time, and the amount of ammonia employed by the solution of a set of simultaneous equations derived from the kinetic model of Table I hereof.

2. The process of claim 1 wherein the inert gas is exhaust gas from the gas turbine.

3. The process of claim 2 wherein the pressure of the combustion effluents before passing through the turbine blades is in the range of about 3 to 15 atmospheres and at a temperature from about 1300° K. to about 1500° K.

4. The process of claim 3 wherein the pressure is from about 6 to 10 atmospheres.

5. The process of claim 2 wherein the concentration of oxygen in the combustion effluent is from about 1 to about 3 volume percent.

6. The process of claim 2 wherein the mole ratio of ammonia to NO is from about 0.4 to 10.

7. The process of claim 6 wherein the mole ratio of ammonia to NO is from about 1 to 3.

8. The process of claim 2 wherein the residence time is from about 0.001 to about 0.02 milliseconds.

* * * * *